March 30, 1965
D. C. ALEXANDER ETAL
3,176,065
INSULATED ELECTRICAL CABLE
Filed Feb. 6, 1963
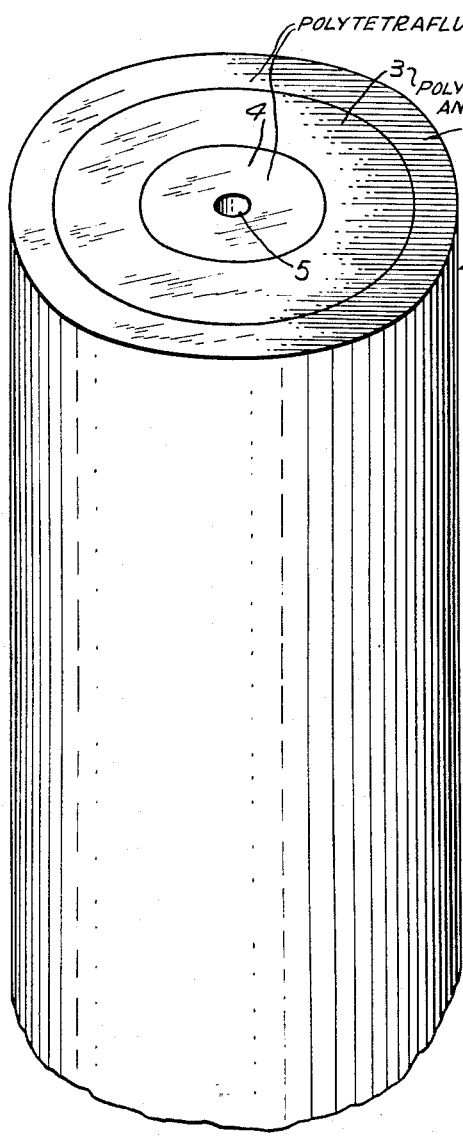
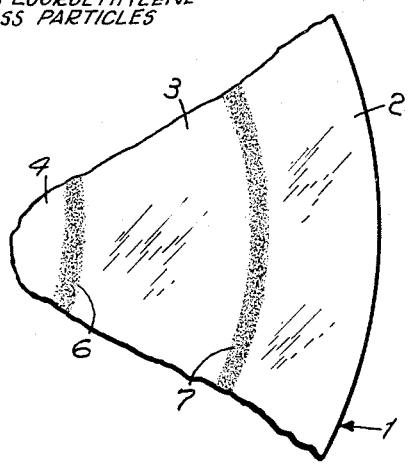
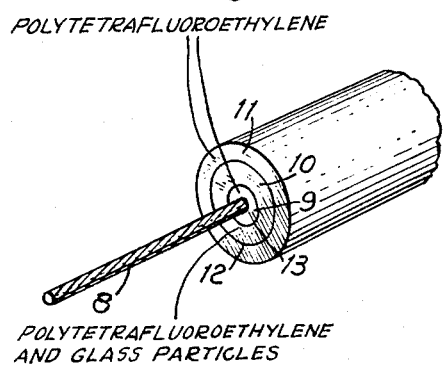
INVENTORS.
DONALD C. ALEXANDER
BY HAROLD L. PIBUS
ATTORNEY United States Patent Office 3,176,065
Patented Mar. 30, 1965

3,176,065
INSULATED ELECTRICAL CABLE
Donald C. Alexander, Paxton, and Harold L. Pibus, Sterling, Mass., assignors to International Telephone and Telegraph Corporation, Nutley, N.J., a corporation of Maryland
Filed Feb. 6, 1963, Ser. No. 256,602
4 Claims. (Cl. 174—120)

This invention relates to insulation for electrical conductors and more particularly to abrasive resistant insulation for wire conductors.

In order to provide tough abrasion resistant insulation for wires, it is known to provide a first wall of insulating material and then a second distinct wall of abrasive resistant material such as asbestos rope to which a coating of water glass may be applied. Practical means of extruding an abrasive resistant layer of insulating material such as polytetrafluoroethylene on wires were not heretofore known. This is due to the fact that when abrasive resistant material is mixed with insulating material the abrasive resistant material damages and fouls up the extruder. When multiple discrete layers of insulating material and inorganic materials are provided by applying one layer to the preceding layer, wicking can occur between the layers. This is true, for example, when a coating of polytetrafluoroethylene is covered with a coating consisting of a mixture of polytetrafluoroethylene and inorganic filler such as glass braid impregnated with polytetrafluoroethylene. Further, abrasive resistant wire insulated by present methods tends to be both bulky and heavy which is especially disadvantageous when used airborne equipment. Abrasion resistant insulation is especially desirable on a wire which will be located adjacent corner or rough surfaces and subjected to motion in relation to such surfaces.

It is therefore an object of this invention to provide insulation for electric cables consisting of layers of insulating material and abrasive filler which will not wick.

Another object is to provide light-weight, tough, and abrasion resistant insulation.

Another object is to provide means for extruding a mixture of polytetrafluoroethylene and abrasive filler which will not injure the extruder and will result in a smooth outer surface.

Still another object is to provide a homogeneous sheath for conductors which consists of walls of insulating material and abrasive filler.

A further object is to provide a method for producing insulation for a cable consisting of at least two integral layers.

A novel feature of our invention is insulation for a cable which consists of an inner layer of insulating material, a middle layer of abrasive resistant material, and an outer layer of insulating material wherein the interfaces of the different layers are sintered and diffused to form an integral insulating material which provides good insulating characteristics, prevents wicking, and is abrasion resistant.

This invention is made possible through the provision of a preform consisting of three concentric layers of material. The inner and outer layers are composed of insulating material and the middle layer consists of abrasion resistant insulating material. When extruded by being forced through an area reduction die, the abrasive layer does not affect the extruder as only the inner and outer layers of insulating material coact with the extruder. Also the outer layer of insulating material produces a smooth coating after being sintered.

The above-mentioned and other objects and features of our invention will become more apparent by reference to the following description taken in conjunction with the accompanying drawings, in which:

FIGURE 1 is a perspective view of a preform in accordance with our invention;
FIGURE 2 is an enlarged view of a fragmentary end portion of the preform of FIGURE 1; and
FIGURE 3 is a perspective view of a wire insulated in accordance with our invention.

Our preform is illustrated in FIGURE 1. A preform consists of powdered materials which are pressed together so that they can ge handled as a unit. Preform 1 is composed of three concentric layers of material 2, 3, and 4. Aperture 5 is concentric and coincident with the axis of the preform. Methods and apparatus for producing preforms of this type are shown in U.S. patent application No. 256,600 filed of even date. FIGURE 2 shows the diffusion present at interfaces 6 and 7 between layers 2 and 3, and 3 and 4, respectively.

Referring now to FIGURE 3 which consists of a partially cross-sectioned view to more clearly illustrate our invention. Conductor 8 is protected by a layer of insulating material 9, a layer of abrasive resistant material 10 surrounding layer 9, and a layer of insulating material 11 surrounding layer 10. Wicking cannot occur between the layers as they are fusionally united at interfaces 12 and 13. Layers 9 and 11 consist of polytetrafluoroethylene and layer 10 consists of a mixture having a composition range of between 50% and 90% polytetrafluoroethylene and between 10% and 50% aluminum oxide. It has been found that the particle size influences the product characteristic to a great extent. In the case of aluminum oxide particles in a range of 200 to 50 grit are desirable. In a preferred embodiment of preform, it has been found that aluminum oxide of 120 grit provides optimum characteristics of the end product. In a preferred embodiment of our invention, layers 9 and 11 consist of polytetrafluoroethylene and layer 10 consists of a mixture of 75% polytetrafluoroethylene and 25% aluminum oxide. Other abrasive fillers may be used which consist of particles of abrasive resistant material such as glass, etc. In connection with the utilization of glass particles as an abrasive resistant filler in layer 10, it has been determined that a range of between 50% and 90% polytetrafluoroethylene and between 10% and 50% glass particles results in a satisfactory composition for layer 10. Utilizing our method of protecting the extruder from the wall or layer containing abrasive resistant filler, we have found that the mixture can be varied without injurious effect on the extruder. Interfaces 12 and 13 are not distinct as there is diffusion at the boundaries during the processes of forming the preform and extruding the insulating coating.

The method of applying the coating is as follows: A preform consisting of three concentric layers of desired materials is placed in an extruding machine by being slipped over a tube through which the wire to be insulated is drawn. The preform has been impregnated with oil or a suitable organic solvent so that the powdered particles forming the preform adhere to one another and so that lubrication is provided to lessen back pressure when the preform is forced under pressures between 100 and 1,000 pounds per square inch through the area reduction portion of the extruder. After the coating has been placed on the wire, the wire and coating is drawn through an oven at approximately 750° F., where it is sintered to form a tough integral insulative coating and the solvent or oil is forced out of the composition.

We have found that insulation consisting of outer and inner layers of polytetrafluoroethylene and a center layer of a mixture of polytetrafluoroethylene and abrasive filler are twice as abrasive resistant as an insulation consisting of the same thickness of pure polytetrafluoroethylene.

These tests were made in accordance with military specification Mil-T-5438. When a thirty-six inch mold is used having a diameter of two and one half inches and the finished preforms consist of polytetrafluoroethylene compressed to approximately fourteen inches in length, one such preform can be extruded to form between 600 and 700 feet of fourteen gauge wire insulation. Preforms thus made, have been used in an extrusion machine which will accommodate three such preforms. They are threaded on to a metal tube through which the wire to be coated is fed. When a three layer preform is used, the layers are maintained in the same relation to form three coats of insulation. When the material is sintered, the interfaces between the walls fuse and thus prevent wicking. Also, the three preforms themselves weld together at their junctions to form one continuous coat of insulation.

While we have described above the principles of our operation in connection with specific apparatus, it is to be clearly understood that this description is made only by way of example and not as a limitation to the scope of our invention as set forth in the objects thereof and in the accompanying claims.

We claim:
1. An insulated cable comprising, a conductor, extruded layers of insulating material surrounding said conductor, said extruded layers comprising a first layer of insulating material adjacent said conductor, a second layer of insulating material containing abrasive resistant particles thoroughly intermixed therein surrounding said first layer of insulating material, and a third layer of insulating material surrounding said second layer, the interfaces between said first and second layers and between said third and second layers being a fusion of the insulating materials therein whereby the insulating materials of all three layers form a unitary mass and the abrasive resistant particles of said second layer are contained within an annular zone of said unitary mass insulating material.

2. An insulated cable according to claim 1 wherein the insulating materials of said first, second and third layers comprise polytetrafluoroethylene.

3. An insulated cable according to claim 1 wherein said abrasive resistant particles comprises particles of glass.

4. An insulated cable according to claim 1 wherein said abrasive resistant particles comprises particles of aluminum oxide.

References Cited by the Examiner
UNITED STATES PATENTS

| | | | |
|---|---|---|---|
| 2,606,134 | 8/52 | Sanders | 174—110 |
| 2,939,178 | 6/60 | Haroldson et al. | 18—55 |
| 3,024,813 | 3/62 | Sear et al. | 138—141 X |
| 3,026,223 | 3/62 | Vanderbilt et al. | |

FOREIGN PATENTS

| | | |
|---|---|---|
| 525,960 | 6/56 | Canada. |
| 590,875 | 7/47 | Great Britain. |

DARRELL L. CLAY, *Primary Examiner.*

JOHN P. WILDMAN, JOHN F. BURNS, LARAMIE E. ASKIN, *Examiners.*